United States Patent
Odom

(10) Patent No.: US 6,376,838 B1
(45) Date of Patent: Apr. 23, 2002

(54) FORMATION EVALUATION COMBINATION SYSTEM FOR PETROPHYSICAL WELL LOG ANALYSIS

(75) Inventor: Richard Charles Odom, Benbrook, TX (US)

(73) Assignee: Computalog USA, Inc., Forth Worth, TX (US)

( * ) Notice: Subject to any disclaimer, the term of this patent is extended or adjusted under 35 U.S.C. 154(b) by 0 days.

(21) Appl. No.: 09/398,870

(22) Filed: Sep. 20, 1999

Related U.S. Application Data

(63) Continuation-in-part of application No. 09/036,287, filed on Mar. 6, 1998, now Pat. No. 6,150,655.

(51) Int. Cl.[7] .................................................. G01V 5/12
(52) U.S. Cl. ................................ 250/269.6; 250/269.7; 324/339
(58) Field of Search .......................... 250/269.6, 269.7; 324/339

(56) References Cited

U.S. PATENT DOCUMENTS

| | | | |
|---|---|---|---|
| 2,991,364 A | 7/1961 | Goodman | |
| 4,048,495 A | 9/1977 | Ellis | 250/264 |
| 4,055,763 A | 10/1977 | Antkiw | 250/270 |
| 4,297,575 A | 10/1981 | Smith, Jr. et al. | 250/265 |
| 4,628,202 A | 12/1986 | Minette | 250/269 |
| 4,810,876 A | 3/1989 | Wraight et al. | 250/256 |
| 4,916,616 A | 4/1990 | Freedman et al. | |
| 5,402,069 A | 3/1995 | Tabanou et al. | 324/351 |
| 5,528,556 A | * 6/1996 | Seeman et al. | 324/339 |
| 5,900,627 A | * 5/1999 | Odom et al. | 250/269.6 |
| 6,150,655 A | * 11/2000 | Odom et al. | 250/269.6 |

FOREIGN PATENT DOCUMENTS

| | | |
|---|---|---|
| EP | 0 323 773 A2 | 7/1989 |
| EP | 0 505 261 A2 | 9/1992 |
| GB | 1584060 | 2/1981 |
| WO | WO 98/58278 | 1/1998 |

OTHER PUBLICATIONS

L.A. Jaconson, R. Ethridge, and D.F. Wyatt,Jr., "A New thermal Multigate Decay–Lithology Tool," SPWLA 35th Annual Logging Symposium, Jun. 19–22, 1994.

Jeffrey L. Baldwin, Richard M. Bateman, Charles L. Wheatley, "Application of a Neural Network tot he Problem of Mineral Identification from Well Logs," The Log Analyst Sep.–Oct., 1990.

Darwin V. Ellis, "Well Logging for Earth Scientists".

D.C. McCall and J.S. Gardner, "Litho–Density Log Applications in the Michigan and Illinois Basins," SPWLA Twenty–Third Annual Logging Symposium, Jul. 6–9, 1982.

(List continued on next page.)

*Primary Examiner*—Constantine Hannaher
*Assistant Examiner*—Andrew Israel
(74) *Attorney, Agent, or Firm*—Geoffrey A. Mantooth

(57) ABSTRACT

A method of measuring characteristics of a geologic formation, using the time, energy and spatial spectra of gamma rays induced by an accelerator, which allows (i) the measurement of the photoelectric absorption ($P_e$) factor of the formation using a gamma-ray spectrum detected from gamma rays induced in the formation, (ii) the calculation of a neutron porosity of the formation using the gamma-ray spectrum, and (iii) the determination of a bulk density of the formation using the spectroscopic measurements. The $P_e$ factor may be inferred by directly mapping the spectroscopic measurements. The porosity may be calculated by relating the gamma-ray spectrum to a hydrogen content of the formation. The density may be determined by computing a gamma diffusion length of the formation based on the gamma-ray spectrum. In addition to these measurements, the resistivity of the formation and its spontaneous potential may also be measured using an electromagnetic induction system.

23 Claims, 4 Drawing Sheets

OTHER PUBLICATIONS

J.H.Fang, C.L. Karr, D.A. Stanley, "Transformation of Geochemical Log Data to Minerology Using Genetic Algorithms," The Log Analyst, Mar.–Apr. 1996.

L.A. Jocobson and D.F. Wyatt, "Elemental Yields and Complex Lithology Anaylsis from the Pulsed pectral Gamma Log," The Log Analyst, Jan.–Feb., 1996.

http://www.recsys.com/neural2.htm, "Neural Computing–Inside the Black Box," 1997, Recognition Systems, Inc.

J.T. Darwin, C.W. Johnson, W.B. Wallley, and R.P. Alger, "Thermal Neutron Decay Time Logging Using Dual Detection," SPWLA publication, pp. 217–273.

C.J. Serpas, P.A. Wichmann, W.H. Fertl, M.R. DeVries and R.R. Randall, "The Dual Detector Neutron Lifetime Log—Theory and Practical Applications," SPWLA publication, pp. 362–397.

H.D. Scott, P.D. Wraight, J.L. Thornton, J.R. Olsen, R.C. Hertzog, D.C. McKeon, T. DasGupta, I.J. Albertin, "Response of a Multidetector Pulsed Neutron Porosity Tool," SPWLA 35th Annual Logging Symposium, Jun. 19–22, 1994.

* cited by examiner

FORMATION EVALUATION COMBINATION SYSTEM FOR PETROPHYSICAL WELL LOG ANALYSIS

CROSS-REFERENCES TO RELATED APPLICATIONS

This application is a continuation-in-part of U.S. Pat. No. 09/036,287 filed Mar. 6, 1998 now U.S. Pat. No. 6,150,655, entitled "Inferential Measurement of Photoelectric Absorption Cross-Section of Geologic Formations from Neutron-Induced, Gamma Ray Spectroscopy."

BACKGROUND OF THE INVENTION

1. Field of the Invention

The present invention generally relates to oil and gas well (borehole) logging tools, and more particularly to an improved method of measuring several different characteristics of a geologic formation, including resistivity, density and porosity, using a single borehole tool.

2. Description of the Related Art

Logging tools for measuring earth formation properties are well known, particularly those used in the location of underground petroleum products (oil and gas). Borehole logging instruments use various techniques to determine geophysical properties such as bulk density, porosity, water saturation, and hydrocarbon type and saturation. The lithology of the formation can also be predicted from wellbore instruments, i.e., whether the rock constituents are predominantly sandstone, limestone, dolomite, etc. From the measurement of these properties, the likelihood of producible quantities of hydrocarbons is calculated and optimized.

Techniques for ascertaining formation properties include those involving the use of radiant (electromagnetic) energy. For example, gamma rays are commonly used to measure bulk density of a formation by detecting such radiation as it passes through the formation, and relating the amount of detected radiation to the electron density of the formation. See, e.g., U.S. Pat. No. 4,297,575. Gamma rays can be emitted continuously from a source in the borehole tool and propagate outward into the formation. This approach is known as gamma-gamma logging, because gamma rays originate in the tool, and the backscattered rays are thereafter detected in the tool. A typical gamma-ray source is cesium-137. Formation properties can be determined based on the count rate or intensity of the gamma rays that are received at detectors located in the tool. Usually at least two detectors (far and near) are used, which allows a measure of formation density that is essentially independent of the mudcake surrounding the tool (the mudcake is the layer of solid material lining the open borehole that has consolidated from the drilling fluid).

Another common parameter which is measured in geophysical well log analyses is the formation photoelectric absorption cross-section. Photoelectric absorption (also known as the photoelectric factor, or $P_e$) is dependent on the average atomic number of the irradiated sample. The $P_e$ cross-section refers to the profile of the photoelectric absorption of the formation along a borehole section which is being investigated. Quantitative methods have been devised in the prior art for measuring $P_e$. These measurements are useful in determining the formation lithology because of their sensitivity to, e.g., calcium.

One standard method for measuring $P_e$ is used in the borehole tool sold by Schlumberger Technology Corp. under the trademark LDT. The LDT tool is a gamma-gamma device, and its method of operation is further described in U.S. Pat. No. 4,048,495. The determination of the photoelectric factor is accomplished by measurement of the shape of the detected gamma-ray spectrum. With a properly calibrated LDT, $P_e$ can be inferred from the relationship between the count rates in a high energy window and a low energy window. A $P_e$ measurement can be further utilized to determine absolute elemental concentrations, as disclosed in U.S. Pat. No. 4,810,876. See also U.S. Pat. No. 4,628,202 which sets forth a variation on the LDT methodology, by developing an interrelationship between the photoelectric factor and density.

Instead of providing a radioactive gamma-ray source, gamma radiation can be produced in the formation in response to a high-energy neutron source (i.e., a neutron accelerator located in the borehole tool). This technique is referred to as induced gamma-ray logging. The radiation is analyzed using one of two common techniques to determine the porosity (not density) of the formation. The two methodologies are referred to as GST (gamma spectroscopy tool) and C/O (carbon:oxygen). In the GST-type method, silica, calcium and hydrogen levels are broken out using spectral techniques, and the amount of hydrogen is compared to the combined amount of silica and calcium to determine porosity. See Fang et al., "Transformation of Geochemical Log Data to Mineralogy Using Genetic Algorithms," Log Analyst, vol. 37, no. 2 (1996). In C/O systems, carbon and oxygen levels are determined using spectral techniques and the ratio is then related to porosity.

When the neutron source is pulsed, gamma rays are produced by one of three reactions: inelastic scattering of fast neutrons (neutrons with energies in the range of 0.1 to 14 MeV); thermal neutron capture (neutrons that have slowed to a thermal velocity of typically 0.025 eV); and delayed emission from isotopes formed by neutron activation. The fast-neutron lifetimes are very small (a few microseconds) such that during the source pulse a mixed-energy neutron field exists. Shortly after the burst, all neutrons are thermalized (slow down) and these thermal neutrons wander about until being captured, with a lifetime in the hundreds of microseconds. Gamma rays from inelastic scattering are produced in close proximity to the accelerator, and gamma rays from thermal capture are dispersed farther from the accelerator (up to tens of centimeters). See, e.g., U.S. Pat. No. 4,055,763.

Another standard measurement is the thermal neutron porosity. This measurement uses a chemical source of fast neutrons such as Am241Be or Ca252. The subsequent distribution of thermal neutrons is dependent on the hydrogen content of the incident media. This hydrogen content is then used to make porosity. A new system marketed as APS, accelerator porosity sonde, by Schlumberger, uses an accelerator to replace the chemical AmBe source. This system has an array of thermal and epithermal neutron detectors to measure the neutron spatial distribution to make a hydrogen-based porosity. See Scott et al., "Response of a Multidetector Pulsed Neutron Porosity Tool," SPWLA Logging Symposium (June 1994).

Oftentimes, in open-hole well-logging and logging-while-drilling (LWD), it is desirable to take a set of the foregoing measurements. One prior art tool 2, shown in FIG. 1, is referred to as a "triple combo," and measures resistivity (from an electromagnetic (EM) induction system 4), bulk density (from a system 6 which includes a photoelectric factor determination), and porosity (from a compensated neutron (CN) system 8). When combined with a natural gamma ray detector 10 and a spontaneous potential measurement from EM induction system 4, the measurement set provides a powerful basis for well log analyses to evaluate for oil and gas production. A sonic system may be added, which is referred to as a "quad-combo."

While a triple-combo or quad-combo tool provides several useful measurements in one instrument, it still has certain disadvantages. First, the chemical sources (AmBe for the compensated neutron system and Cs for the density and $P_e$ factor), present safety and health concerns to the well operator, as well as liability issues if the tool is lost or trapped in the well. The triple-combo tool is also particularly long, usually between 60 and 90 feet, making it more cumbersome, and requiring an extra length of "rat-hole" that must be drilled. These measurements also have a limited penetration, typically requiring pads and linkages to maintain proper borehole contact. It would, therefore, be desirable to devise a convenient method for measuring a set of parameters in an earth formation, which overcomes the foregoing limitations. It would be further advantageous if the method allowed other simultaneous measurements.

SUMMARY OF THE INVENTION

It is therefore one object of the present invention to provide an improved method of measuring a plurality of formation characteristics using a downhole tool.

It is another object of the present invention to provide such a method and tool which provides density, lithology and porosity measurements, but which uses a tool having a shorter length than conventional tools.

It is yet another object of the present invention to provide such a method and tool which uses a single accelerator-based sonde for a wide variety of traditional open-hole logging measurements.

The foregoing objects are achieved in a method for measuring characteristics of a geologic formation, generally comprising the steps of inducing gamma rays in the formation, detecting a gamma-ray spectrum associated with the gamma rays, measuring the photoelectric absorption ($P_e$) factor of the formation using spectroscopic measurements of the gamma-ray spectrum, calculating a neutron porosity of the formation using the spatial distribution of the induced neutrons, and determining a bulk density of the formation using the spatial distribution of the induced gamma rays. The measuring of the $P_e$ factor may include the step of inferring the photoelectric absorption of the formation by directly mapping the spectroscopic measurements. The calculating of the porosity may include the step of relating the spectroscopic measurements to a hydrogen content of the formation. The determining of the density may include the step of computing a gamma diffusion length of the formation based on the spectroscopic measurements. In addition to these measurements, the invention contemplates the measurement of a resistivity of the formation, concurrently with said inducing step, using an electromagnetic induction system. The spontaneous potential of the formation may also be measured using the electromagnetic induction system. The gamma rays can be induced by pulsing a fast neutron source proximate the formation. A gamma-ray detector may be placed at a substantial distance from the source (e.g., eight feet) for measuring the natural radioactivity of the formation.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
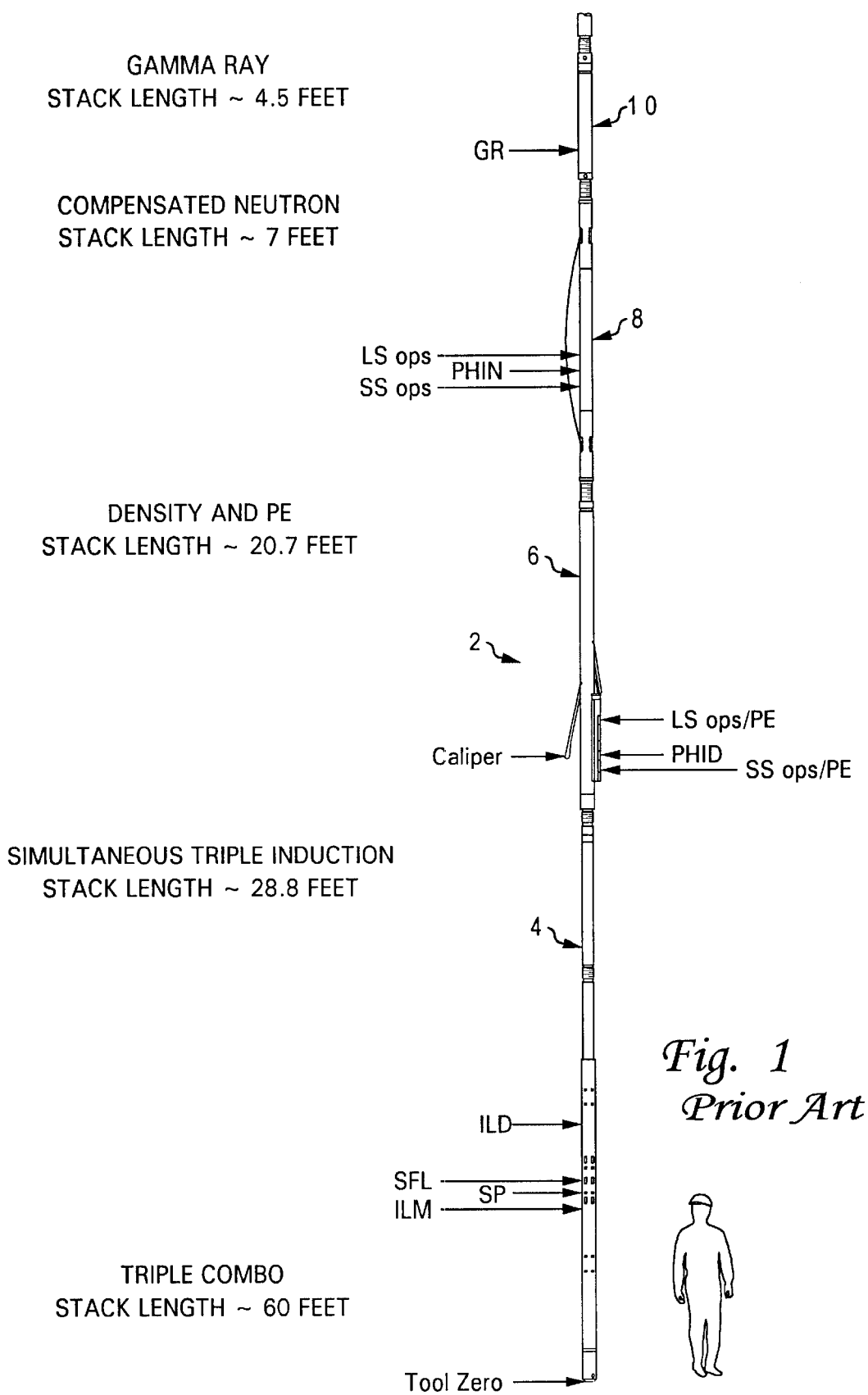
FIG. 1 is an elevational view of a conventional "triple-combo" borehole logging tool providing resistivity, density, and porosity measurements.
Figure 2:
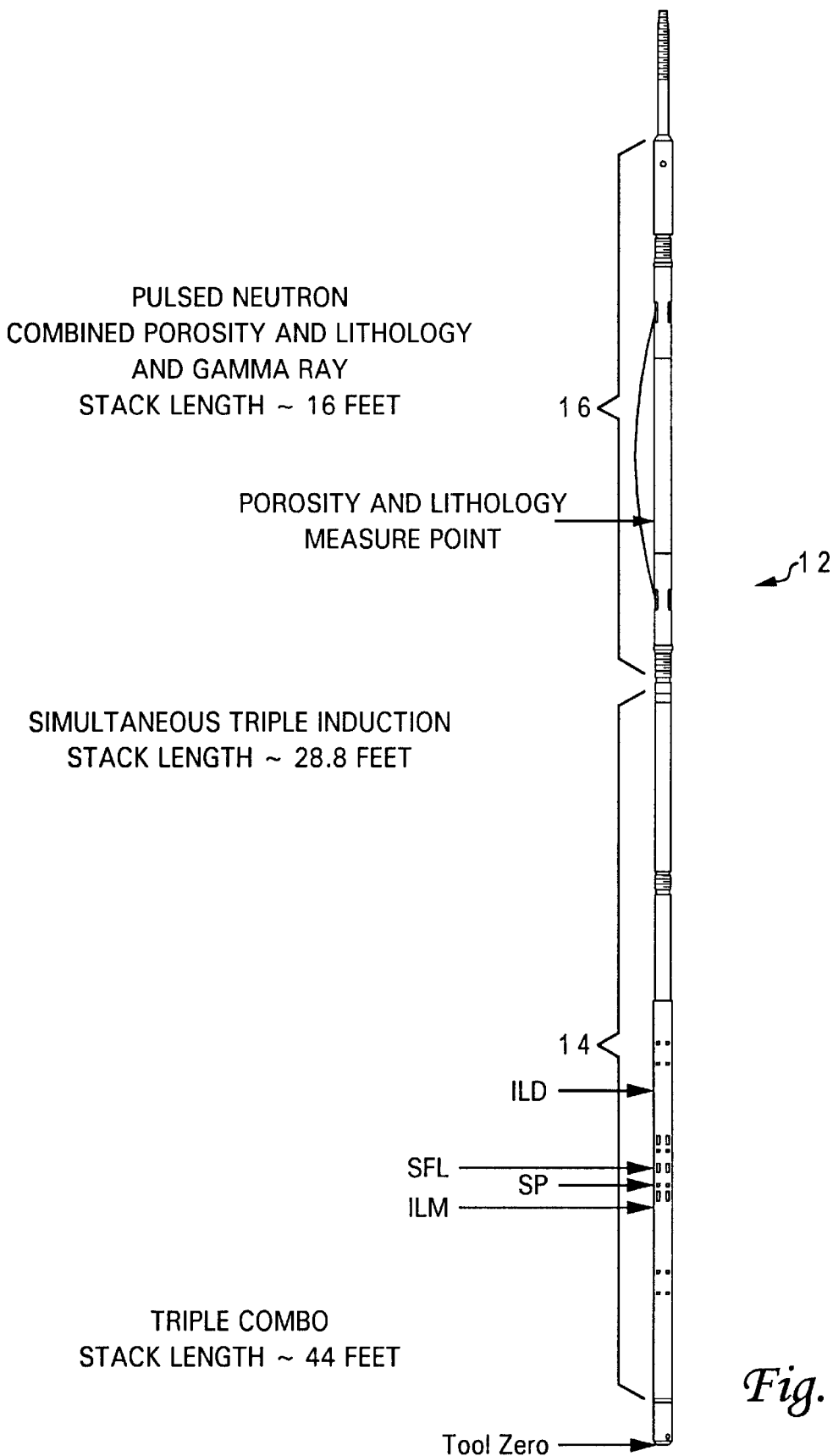
FIG. 2 is an elevational view of an improved borehole logging tool constructed in accordance with the present invention which also provides resistivity, density, and porosity measurements.

With reference now to the figures, and in particular with reference to FIG. 2, there is depicted one embodiment of a formation evaluation combination tool 12 for petrophysical well log analysis constructed in accordance with the present invention. Tool 12 is adapted to support all of the measurements of a conventional triple-combo system, but provides improved sondes or sub-systems which replace certain sondes on a typical triple-combo tool. In the illustrated embodiment, tool 12 includes an electromagnetic (EM) induction system 14, and a pulsed neutron combined porosity, lithology and gamma ray system 16. Tool 12 is adapted to be connected to a surface computer (see FIG. 3) and lowered into a well bore by a wireline and appropriate mechanical support. The surface computer is used for data acquisition, analysis and storage, and can merge various data with other raw measurements for storage and later presentation.

EM induction system 14 may use conventional techniques to provide resistivity and spontaneous potential measurements, such as that used in Computalog's STI™ logging tool and described in U.S. Pat. No. 5,500,597. Pulsed neutron combined system 16, used concurrently with EM induction system 14, is based on a fast neutron accelerator and multiple gamma ray detectors, and is designed to replace the compensated neutron system, and the density and photoelectric factor measurement from the litho-density system. System 16 includes a natural gamma-ray detector at a large spacing from the accelerator source.

Figure 3:
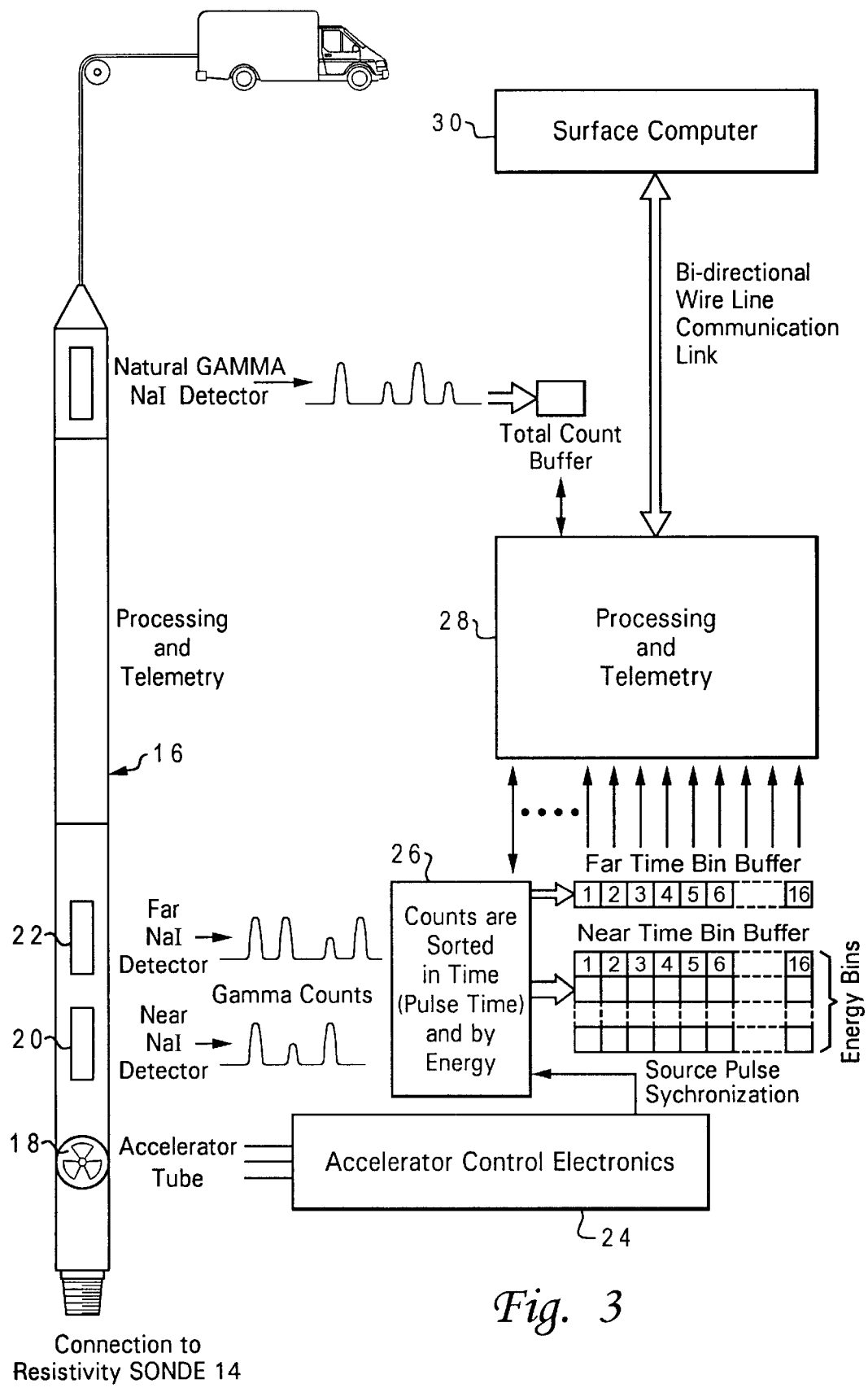
FIG. 3 is a schematic diagram illustrating a logging system using the improved borehole logging tool of FIG. 2, wherein gamma-ray events are sorted in time-dependent and energy-dependent bins according to one implementation of the present invention.

As further shown in FIG. 3, system 16 uses an accelerator-based fast neutron source (D-T tube) 18 with a pulse of 14 MeV neutrons. The near and far detectors 20 and 22 are NaI (Tl) crystals optically coupled to high count rate photomultiplier tubes. The neutron source is pulsed with a 10% duty cycle in a frequency range of 200 to 1428 Hz with the firing frequency constantly adjusted to optimize the measurement cycle (by adjusting the firing cycle to be sensitive to the formation decay rate, the formation signal-to-borehole-noise is enhanced). Accelerator control electronics 24 synchronize a counter 26 with the source pulse, and counter 26 sorts the gamma-ray events (counts) in time-dependent and energy-dependent bins. These sorted counts are gathered by the processing and telemetry module 28 which forwards the data to a surface computer 30.

Figure 4:
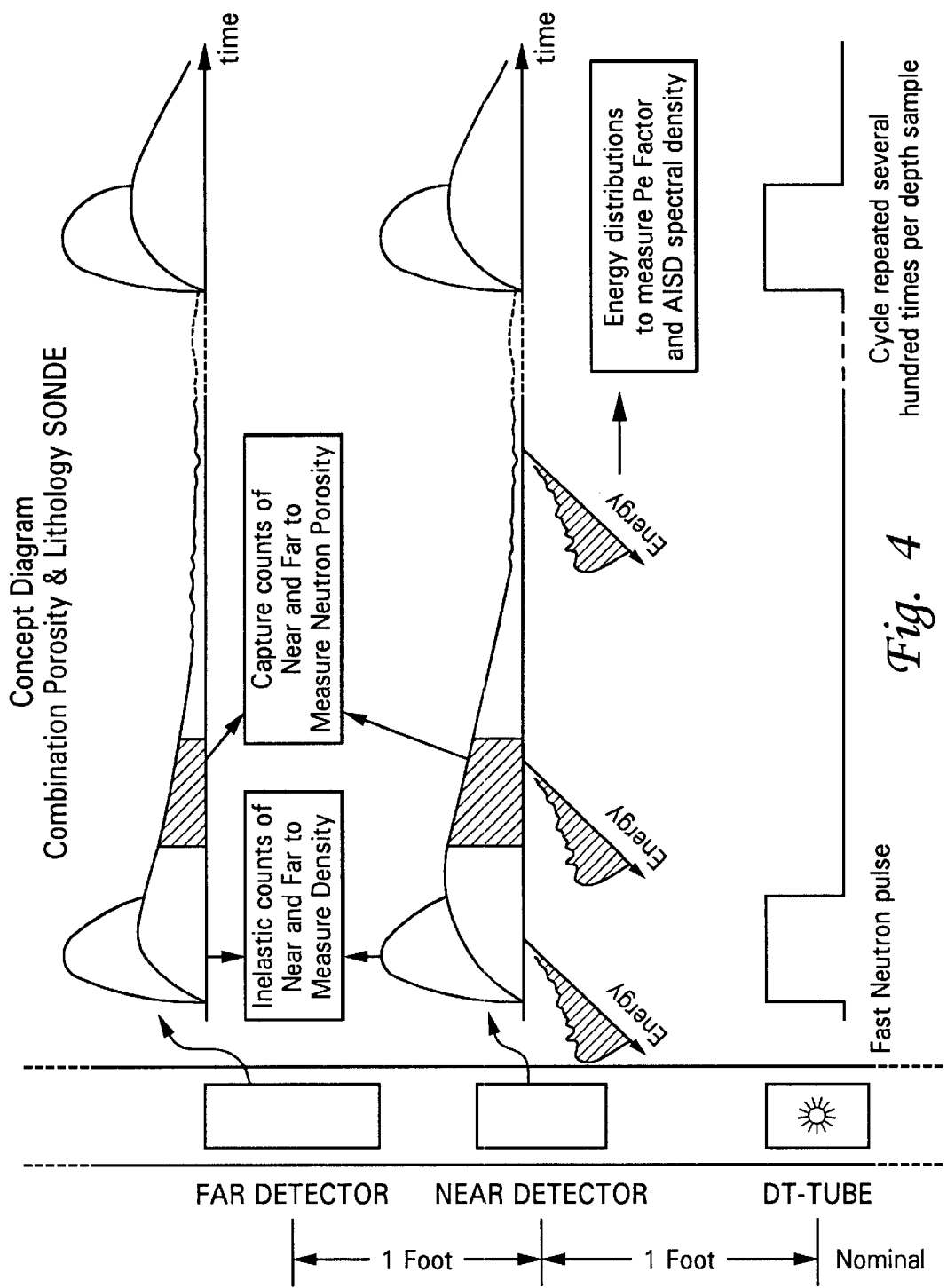
FIG. 4 is a graph depicting the received gamma-ray signals from inelastic scattering, thermal neutron capture and neutron activation reactions, which are used to measure the photoelectric absorption ($P_e$) factor and spectral density, and the near/far thermal ratio which is used for determining neutron porosity.

As further shown in FIG. 4, inelastic counts from the near and far detectors are used to measure density, while the capture counts from the near and far detectors are used to measure neutron porosity, and the energy distributions are used to measure the photoelectric factor and spectral density. The pulse and measurement cycle may be repeated several hundred times per sample.

The sondes used to construct tool 12 may have a maximum outer diameter of as little as four inches (10.16 cm).

The neutron porosity can be measured from the spatial distribution of thermal neutrons, using two neutron detectors at different spacings. This spatial ratio is then related to the hydrogen content which can then be related to the liquid filled porosity. Similarly, the gamma rays created by thermal neutron capture can be sampled at two different spacings in the pulsed neutron sonde and related to the hydrogen-based porosity. See Dewan et al., "Thermal Neutron Decay Time Logging Using Dual Detection," SPWLA Logging Symposium (May 1973), and Serpas et al., "The Dual Detector Neutron Lifetime Log—Theory and Practical Applications." The near to far ratio of counts during the time when formation capture counts are the dominant reaction mapped into Hydrogen-based porosity. There are also some second-order effects that can be eliminated based on the borehole parameters and the formation capture cross-section to improve the accuracy.

The formation density measurement can be made in a manner as described by U.S. Pat. No. 5,900,627, which is hereby incorporated. The inelastic scattering of fast neutrons is used to produce a dispersed gamma source centered around the neutron accelerator. As the pulse of fast neutrons spreads, the neutrons are slowed from elastic and inelastic scattering with the incident media. The dominant reactions for producing gamma rays are inelastic scattering of fast neutrons and thermal neutron capture. The fast neutron lifetimes are very small (a few microseconds) such that during the source pulse a mixed-energy neutron field exists. Shortly after the burst, all neutrons have been thermalized, and these thermal neutrons wander about until being captured with a lifetime of hundreds of microseconds. Gamma ray events are sorted and counted in time- and energy-dependent bins associated with five spectral channels ranging from 105 KeV to greater than 4.5 MeV. Data from approximately 500 pulses is accumulated into a sample which is then transmitted to the surface. The gamma diffusion length is measured by analyzing gamma rays exclusively from inelastic scattering. The separation or stripping of inelastic events from the mixed-event count are preferably accomplished using the techniques described in U.S. Pat. No. 5,374,823, wherein the measured exponential decay rates for thermal neutrons are projected to obtain a value for thermal neutron capture components of the total energy spectra detected during neutron burst periods. Corrections are made for environmental (borehole) conditions, using calibration mapping, resulting in the calculated formation density.

The formation $P_e$ factor can be measured in a manner as described by U.S. patent application Ser. No. 09/036,287, which is hereby incorporated. The neutron-induced spectroscopy measurements are directly mapped to estimate or infer the formation photoelectric absorption cross-section.

The $P_e$ measurement may then be used to determine the formation lithology as is known in the art. The mapping function may be carried out using a multi-layer perception (MLP) neural network.

A sonic system may be combined in the tool string if desired.

The present invention has several advantages, including a much deeper depth of investigation. A larger sample size also makes the measurement less sensitive to geometry factors, such as borehole rugosity and tool-pad contact, and means a small-diameter, mandrel-type tool (with no mechanical linkages or pad) can be used to take these measurement. Induced gamma ray logging can use an electronic source which has advantages in safety and disposal compared to chemical gamma sources. The electronic source has only a small amount of low level radioactive material and does not generate any potentially harmful at radiation until turned on. Furthermore, the combined lithology and porosity sonde is much shorter than the sondes used in prior art triple-combo tools which supply the same functionality. The EM induction system 14 sonde is about 29 feet long, and the combined porosity/lithology/gamma ray system 16 sonde is about 16 feet long, making the combination tool 12 have an overall length of about only 45 feet, which is at least 15 feet shorter than a comparable prior art triple-combo tool. This construction thus makes tool 12 easier to handle, and reduces the amount of extra "rat-hole" that must be drilled. Finally, the accelerator source can produce pulses of radiation which allows other simultaneous measurements, such as the formation thermal neutron capture cross-section and induced neutron spectroscopy.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for measuring a combination of characteristics of a geologic formation, comprising the steps of:

inducing gamma rays in the formation;

receiving gamma-ray signals associated with the gamma rays;

measuring the photoelectric absorption factor of the formation using the received gamma-ray signals;

calculating a neutron porosity of the formation based on the received gamma-ray signals; and determining a bulk density of the formation using the received gamma-ray signals.

2. The method of claim 1 wherein said measuring step includes the step of inferring the photoelectric absorption of the formation by directly mapping the received gamma-ray signals.

3. The method of claim 1 wherein said calculating step includes the step of relating spatial distributions of the received gamma-ray signals to a hydrogen content of the formation.

4. The method of claim 1 wherein said determining step includes the step of computing a gamma diffusion length of the formation based on spatial distributions of the received gamma-ray signals.

5. The method of claim 1 further comprising the step of measuring a resistivity of the formation, concurrently with said inducing step, using an electromagnetic induction system.

6. The method of claim 5 further comprising the step of measuring a spontaneous potential of the formation, concurrently with said inducing step, using the electromagnetic induction system.

7. The method of claim 1 wherein said inducing step includes the step of generating pulses of fast neutrons utilizing an accelerator source proximate the formation.

8. The method of claim 7 further comprising the steps of:

synchronizing a counter with the fast neutron source; and sorting gamma ray events in the gamma-ray spectrum into time- and energy-dependent bins using the counter.

9. A device for measuring a combination of characteristics of a geologic formation, comprising:

means for inducing gamma rays in the formation;

means for receiving gamma-ray signals associated with the gamma rays;

means for measuring the photoelectric absorption factor of the formation using the received gamma-ray signals;

means for calculating a neutron porosity of the formation based on the received gamma-ray signals; and means for determining a bulk density of the formation using the received gamma-ray signals.

10. The device of claim 9 wherein said measuring means includes means for inferring the photoelectric absorption of the formation by directly mapping the received gamma-ray signals.

11. The device of claim 9 wherein said calculating means includes means for relating spatial distributions of the received gamma-ray signals to a hydrogen content of the formation.

12. The device of claim 9 wherein said determining means includes means for computing a gamma diffusion length of the formation based on spatial distributions of the received gamma-ray signals.

13. The device of claim 9 further comprising means for measuring a resistivity of the formation using electromagnetic induction.

14. The device of claim 13 further comprising means for measuring a spontaneous potential of the formation using electromagnetic induction.

15. The device of claim 9 wherein said inducing means and said detecting means are housed in a downhole tool having a length of about 16 feet or less.

16. The device of claim 9 wherein said inducing means includes a fast neutron source which creates gamma rays from inelastic scattering and thermal capture.

17. The device of claim 16 wherein said detecting means includes:

means for synchronizing a counter with said fast neutron source; and means for sorting gamma-ray events of the gamma-ray spectrum into time-and energy-dependent bins.

18. A device for determining a combination of characteristics of a geologic formation comprising:

a fast-neutron accelerator;

a plurality of gamma-ray detectors; and means for simultaneously measuring a set of formation parameters using gamma-ray signals received by said detectors, the parameters including hydrogen-based neutron porosity, formation density, and formation lithology.

19. The device of claim 18 wherein said measuring means includes means for inferring the photoelectric absorption of the formation by directly mapping the received gamma-ray to signals.

20. The device of claim 18 wherein said measuring means includes means for relating spatial distributions of the received gamma-ray signals to a hydrogen content of the formation.

21. The device of claim 18 wherein said measuring means includes means for computing a gamma diffusion length of the formation based on spatial distributions of the received gamma-ray signals.

22. The device of claim 19 wherein said measuring means further includes means for relating spatial distributions of the received gamma-ray signals to a hydrogen content of the formation.

23. The device of claim 22 wherein said measuring means further includes means for computing a gamma diffusion length of the formation based on spatial distributions of the received gamma-ray signals.

* * * * *